United States Patent
Mendis

(10) Patent No.: US 8,924,178 B2
(45) Date of Patent: Dec. 30, 2014

(54) COMPASS HEADING DISPLAY FOR A COMPUTERIZED MOBILE DEVICE

(75) Inventor: Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 482 days.

(21) Appl. No.: 13/198,326

(22) Filed: Aug. 4, 2011

(65) Prior Publication Data
US 2013/0035895 A1    Feb. 7, 2013

(51) Int. Cl.
G01C 9/00     (2006.01)
G01C 17/00    (2006.01)
G01C 21/20    (2006.01)

(52) U.S. Cl.
CPC .............. G01C 17/00 (2013.01); G01C 21/20 (2013.01)
USPC ........................................ 702/150

(58) Field of Classification Search
CPC ...................................... G01C 17/30
USPC ........................................ 702/150
See application file for complete search history.

(56) References Cited

U.S. PATENT DOCUMENTS

| | | | |
|---|---|---|---|
| 5,146,231 A | 9/1992 | Ghaem et al. | |
| 5,627,547 A * | 5/1997 | Ramaswamy et al. | ... 342/357.57 |
| 5,828,585 A | 10/1998 | Welk et al. | |
| 6,529,828 B1 | 3/2003 | Williams et al. | |
| 6,862,525 B1 | 3/2005 | Beason et al. | |
| 7,277,793 B2 | 10/2007 | Witcraft et al. | |
| 2010/0312509 A1 | 12/2010 | Patel et al. | |
| 2010/0312510 A1 | 12/2010 | Piemonte et al. | |
| 2011/0054834 A1 | 3/2011 | Partridge et al. | |

OTHER PUBLICATIONS

International Search Report and Written Opinion for Application No. PCT/US2012/049448, dated Feb. 26, 2012.

* cited by examiner

Primary Examiner — Stephen Cherry
(74) Attorney, Agent, or Firm — Marshall, Gerstein & Borun LLP

(57) ABSTRACT

A method for displaying a compass heading implemented by a computerized mobile device includes displaying a compass heading on a display of a computerized mobile device according to a compass onboard the computerized mobile device if the computerized mobile device is traveling below a motion threshold. The method also includes displaying a compass heading on a display of a computerized mobile device according to a compass heading calculated using at least two coordinates for the computerized mobile device if the computerized mobile device is traveling above the motion threshold.

12 Claims, 3 Drawing Sheets

US 8,924,178 B2

COMPASS HEADING DISPLAY FOR A COMPUTERIZED MOBILE DEVICE

FIELD OF TECHNOLOGY

This patent is directed to a method and a system for displaying a compass heading on a computerized mobile device and the computerized mobile device so programmed, and in particular for the motion-dependent display of a compass heading on a computerized mobile device and the computerized mobile device so programmed.

BACKGROUND

Conventional mobile devices, such as mobile phones, smart phones and the like, typically include an onboard compass. The compass may be used to determine the compass heading that the user is facing by holding the mobile device aligned with that direction. While capable of providing adequate guidance when the mobile device is held stationary, the compass provides a less reliable heading when the user is moving at relatively higher speeds, for example when the user is in a car or riding on a train. It is believed that when the orientation of the onboard compass changes rapidly, the accuracy of the heading provided decreases.

As set forth in greater detail below, the present disclosure sets forth an improved assembly embodying advantageous alternatives to the conventional devices and methods discussed above. In particular, the present disclosure addresses the significant unmet need in providing reliable compass headings for a computerized mobile device when that device is not stationary.

SUMMARY

According to an aspect of the present disclosure, a method for displaying a compass heading, the method implemented by a computerized mobile device, includes receiving at least two coordinates, each coordinate representative of a location of the computerized mobile device, and storing the at least two coordinates in a memory of the computerized mobile device. The method further includes retrieving the at least two coordinates from the memory, and determining if the computerized mobile device is traveling above or below a motion threshold using the at least two coordinates. If the computerized mobile device is traveling below a motion threshold, a compass heading is retrieved from an onboard compass and the compass heading from the onboard compass is displayed on a display unit of the computerized mobile device. If the computerized mobile device is traveling above the motion threshold, a compass heading is determined using the at least two coordinates and the compass heading determined from the at least two coordinates is displayed on the display unit of the computerized mobile device.

According to another aspect of the present disclosure, a tangible non-transitory computer-readable medium has computer executable instructions stored thereon that, when executed by one or more processors of a computerized mobile device, cause the one or more processors to receive at least two coordinates, each coordinate representative of a location of the computerized mobile device, store the at least two coordinates in a memory of the computerized mobile device, retrieve the at least two coordinates from the memory, determine if the computerized mobile device is traveling above or below a motion threshold using the at least two coordinates, retrieve a compass heading from an onboard compass and control a display unit to display the compass heading from the onboard compass if the computerized mobile device is traveling below a motion threshold, and determine a compass heading using the at least two coordinates and control the display unit to display the compass heading determined from the at least two coordinates if the computerized mobile device is traveling above the motion threshold.

According to a further aspect of the present disclosure, a computerized mobile device includes a display unit, an onboard compass unit, a coordinate system receiver, and a processor coupled to the display unit, the onboard compass unit, the coordinate system receiver and a memory. The processor is programmed to receive at least two coordinates via the coordinate system receiver, each coordinate representative of a location of the computerized mobile device, store the at least two coordinates in the memory, retrieve the at least two coordinates from the memory, determine if the computerized mobile device is traveling above or below a motion threshold using the at least two coordinates, retrieve a compass heading from the onboard compass and control the display unit to display the compass heading from the onboard compass if the computerized mobile device is traveling below a motion threshold, and determine a compass heading using the at least two coordinates and control the display unit to display the compass heading determined from the at least two coordinates if the computerized mobile device is traveling above the motion threshold.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

DETAILED DESCRIPTION

In general terms, the present disclose relates to a method for displaying a compass heading on a computerized mobile device, such as a smart phone, that reduces the sensitivity of the displayed compass heading to changes in the motion of the device. To this end, the method includes receiving at least two coordinates, each coordinate representative of a location of the computerized mobile device, and storing the at least two coordinates in a memory of the computerized mobile device. These coordinates may be obtained or received from a global positioning system, for example. The method further includes retrieving the at least two coordinates from the memory, and determining if the computerized mobile device is traveling above or below a motion threshold using the at least two coordinates. If the computerized mobile device is traveling below a motion threshold (for example, a velocity threshold of 1 m/s), a compass heading is retrieved from an onboard compass and the compass heading from the onboard compass is displayed on a display unit of the computerized mobile device. If the computerized mobile device is traveling above the motion threshold, a compass heading is determined using the at least two coordinates and the compass heading determined from the at least two coordinates is displayed on the display unit of the computerized mobile device.

Consequently, the present disclosure relates to a computerized mobile device that includes a display unit, an onboard compass unit, a coordinate system receiver, and a processor coupled to the display unit, the onboard compass unit, and the coordinate system receiver. The processor is programmed in accordance to the method mentioned above. In particular, the processor is programmed to control the display unit to display a compass heading according to the onboard compass unit if the computerized mobile device is traveling below a motion threshold, and to display a compass heading according to a compass heading calculated using at least two coordinates received by the coordinate system receiver if the computerized mobile device is traveling above the motion threshold.

Figure 1:
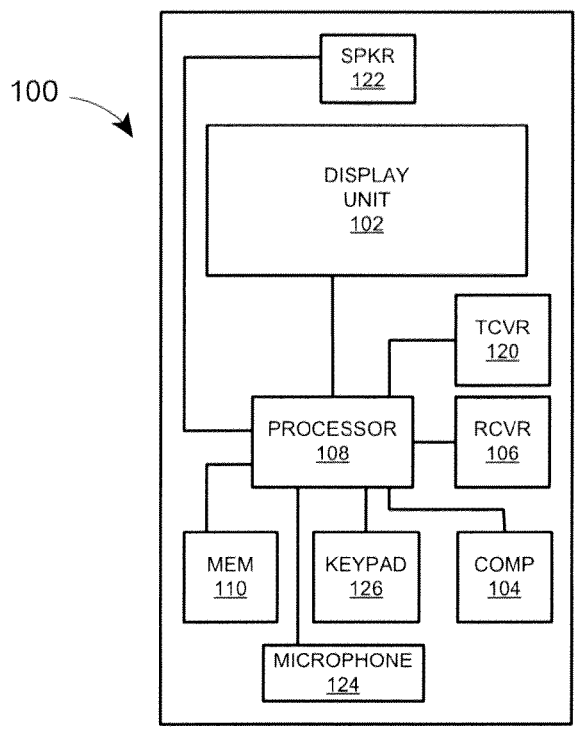
FIG. 1 is a schematic of an exemplary computerized mobile device that may be used with a computer implemented method for displaying a compass heading according to the present disclosure.
Figure 2:
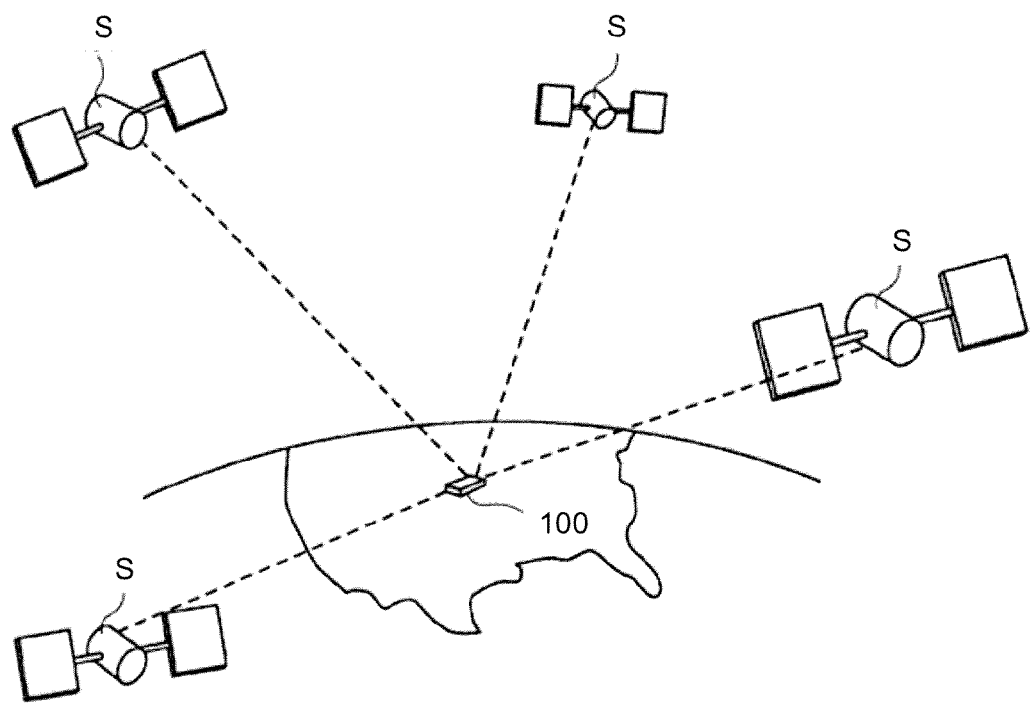
FIG. 2 is a schematic of an exemplary coordinate determining system, such as the Global Positioning System (GPS), as used in combination with the device of FIG. 1.

Therefore, as to one embodiment of the present disclosure, FIG. 1 illustrates computerized mobile device 100 that includes a display unit 102, an onboard compass unit 104, a coordinate system receiver 106 (such as a Global Positioning System (GPS) receiver that is in communication with satellites S, as illustrated in FIG. 2) and a processor or processors 108. The processor 108 may be coupled to the display unit 102, the onboard compass unit 104, and the receiver 106, as well as to one or more tangible non-transitory computer-readable memories 110 having computer executable instructions stored thereon, which when executed by the processor 108, may cause the one or more processors to carry out on or more actions.

Figure 3:
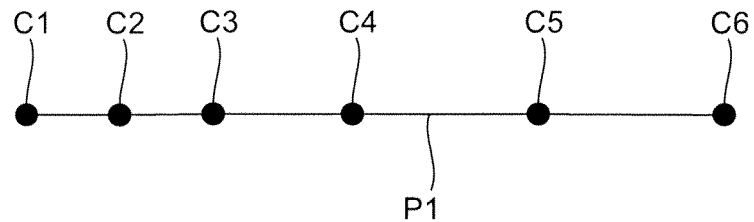
FIG. 3 is an illustration of a path of a computerized mobile device including a plurality of coordinates.

FIG. 3 illustrates the movement of the device 100 along a path P1 having an overall distance of several dozen meters. Along the path P1 are several coordinates C1 to C6. Each coordinate C1 to C6 represents the location of the device 100 at a point in space along the path P1 as the device 100 moves along the path P1. These coordinates C1 to C6 may be determined (e.g., obtained or received) using the coordinate receiver 106 and may be stored by the processor 108 in the memory 110 of the device 100.

It will be recognized that the distance between each pair of successive coordinates is not the same, although the time elapsed between successive pairs of coordinates may be substantially the same. The distances between each pair of successive coordinates C1, C2, C3 is much smaller than between each pair of successive coordinates C4, C5, C6. Such a pattern may occur, for example, where user of the mobile device 100 is walking to an automobile at points C1 to C3, enters the car at C3, and then drives away in the automobile at points C4 to C6. Alternatively, the path P1 may represent the motion of the mobile device 100 as the user climbs on a bicycle or aboard a train, or begins walking briskly.

The timing between successive coordinates may be determined according to the programming of the receiver 106, and may be provided to the receiver 106 by the system S with which the receiver 106 is associated and communicates, or may be determined from information received therefrom. For example, the GPS system provides information that permits the receiver 106 to make a position and a timing determination. However, the present disclosure is not intended to be limited to such as system, and as such the coordinates may be retrieved by the processor 108 instead according to a timing pattern established within the processor 108, or the coordinates may be received or retrieved in a non-periodic fashion, and the processor 108 may be programmed to determine the amount of time that passes between the receipt or retrieval of successive coordinates.

Figure 4:
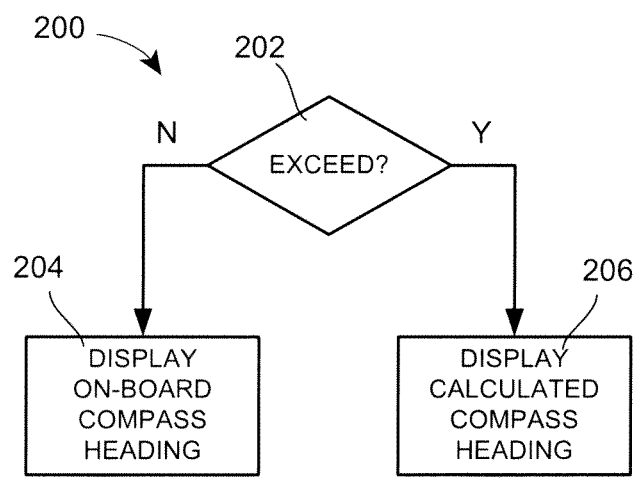
FIG. 4 is a flowchart of an exemplary computer-implemented method for displaying a compass heading according to the present disclosure.

A method 200 according to the present disclosure for displaying a compass heading, for example as the mobile device 100 moves along the path P1, may be found in FIG. 4. The method 200 includes a determination at block 202 whether the mobile device is moving (traveling) above or below a motion threshold. The motion threshold may be a velocity threshold, for example. Alternatively, the motion threshold may be an acceleration threshold, for example. In any event, based on the determination at block 202, the method 200 may proceed either to block 204 or block 206. If it is determined at block 202 that the mobile device 100 is traveling below a motion (velocity) threshold (e.g., 1 m/s), then the processor 108 controls the display unit 102 to display a compass heading on the display unit 102 according to the compass 104 onboard the mobile device 100 (block 204). However, if the mobile device 100 is traveling above the motion threshold, then the processor 108 controls the display unit 102 to display a compass heading on the display unit according to a compass heading calculated using at least two coordinates for the computerized mobile device (block 206).

Because the position of the mobile device 100 may change (as it does along the path P1 illustrated in FIG. 3), the processor 108 may be programmed to perform the determination at block 202 and the actions at blocks 204/206 in a periodic fashion, or the processor 108 may be programmed to perform the actions of blocks 202, 204/206 if the processor 108 determines that there has been a change in the orientation of the mobile device 100. As such, the method 200 may return to block 202 after performing either the display according to the compass at block 204 or the display according to the calculation at block 206.

Figure 5:
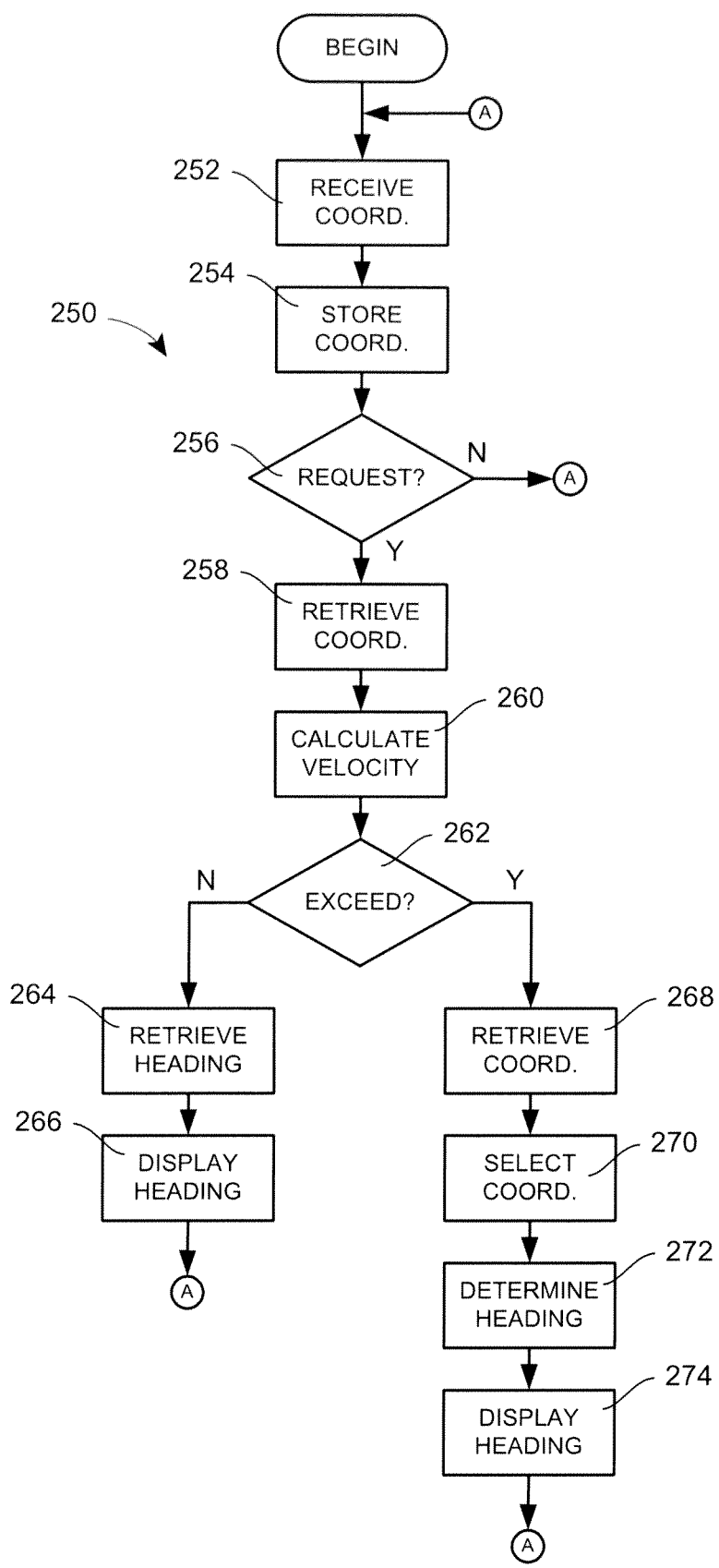
FIG. 5 is a flowchart of another exemplary computer-implemented method for displaying a compass heading according to the present disclosure.

It will also be recognized that the processor 108 may be programmed to perform various determinations and/or calculations to carry out the method 200 illustrated in FIG. 4. To this end, a further, more detailed embodiment of a method 250 according to the present disclosure is illustrated in FIG. 5.

According to the method 250, the processor 108 may receive a plurality of (at least two) coordinates from the receiver 106 at block 252, and the processor 108 may store the plurality of coordinates received by the receiver 106 in the memory 110 at block 254. According to certain embodiments, the processor 108 may receive coordinates periodically from the receiver 106; according to other embodiments, the processor 108 may receive coordinates from the receiver 106 in response to a request sent by the processor 108 to the receiver 106. According to certain embodiments, the processor 108 may store only the two most recently received coordinates; according to other embodiments, the processor 108 may store several recently received coordinates. The method 250 will repeat the actions at blocks 252, 254 until the processor 108 determines at block 256 that a request has been received to display a heading. According to certain embodiments, the processor 108 may determine that a request has been made at block 256 according to an internal reference (e.g., the programming of the processor 108 periodically requests for a heading to be displayed) or according to an external reference (e.g., the user provides an input signal via an input device that is received by the processor 108).

When it is determined at block 256 that a request has been received by the processor 108, the processor 108 may carry out the actions at blocks 258, 260 to determine a characteristic of the motion of the device 100 that will be used at block 262 to determine whether to display a heading based on the onboard compass 104 or a heading based on a heading determined with reference to the coordinates received by receiver 106. According to the method 250, the processor 108 calculates a velocity at block 260 that is then compared at block 262 to determine which heading to display on the display unit 102.

To this end, the processor 108 may retrieve at block 258 coordinates stored by the processor in the memory 110 at block 254, and potentially a time interval associated with the coordinates. According to other embodiments, each of the coordinates may have a time stamp associated therewith, such that a time interval may be calculated from the data regarding coordinates retrieved at block 258. According to an embodiment, the processor 108 may retrieve a first coordinate and a second coordinate from the memory 110, the first and second coordinates being received by the receiver 106 successively in time. Moreover, the second coordinate may represent the position of the device 100 at the time the request at block 256 is received by the processor 108.

As mentioned previously, according to the embodiment of the present disclosure illustrated in FIG. 5, the method 250 may use a velocity to determine which heading is displayed on the display unit 102. To this end, the processor 108 may proceed with the calculation of the velocity at block 260. According to one embodiment, the processor 108 may calculate a distance between the first and second coordinates to determine a distance traveled by the computerized mobile device 100 between the first and second coordinates. Also according to this embodiment, the processor 108 may calculate a time interval between the first and second coordinates to determine a time over which the distance was traveled, which time interval may be calculated according to a first time stamp associated with the first coordinate and a second time stamp associated with the second coordinate. Alternatively, while the distance may be calculated according to the first and second coordinates, the time interval may be obtained with reference to a timer or clock or may be retrieved from memory. In any event, the processor 108 may calculate the velocity by dividing the distance between the first and second coordinates by the time over which the distance was traveled.

At block 262, the processor 108 may determine whether the velocity calculated at block 260 exceeds a threshold (e.g., 1 m/s). If the velocity does not exceed (i.e., is below) the threshold, then the processor 108 carries out the actions at blocks 264, 266. If the velocity does exceed (i.e., is above) the threshold, then the processor 108 carries out the actions at blocks 268, 270, 272, 274.

Assuming that the velocity of the device 100 does not exceed the threshold, then the method 200 proceeds to block 264, with the processor 108 accessing the onboard compass 104 to retrieve a heading therefrom. This retrieval may, for example, include receiving a signal from the compass 104, which signal may be interpreted by the processor 108 as a heading, for example. After retrieving the heading from the compass 104, the processor 108 may control the display unit 102 to display the heading to the user at block 266.

Alternatively, the method 250 may proceed to block 268, and the processor 108 may retrieve two or more of the coordinates previously stored at block 254 in the memory 110, or may retrieve additional coordinates received by the receiver 106 contemporaneous with their retrieval at block 268. The processor 108 may use the retrieved coordinates to determine a vector (and from the vector, a heading) with its origin at a first coordinate and passing through a second coordinate, the first and second coordinates being received successively in time by the receiver 106 at block 272. However, before determining the vector, the method 250 may optionally select at block 270 the coordinates to be used at block 272 from those retrieved at block 268.

Figure 6:
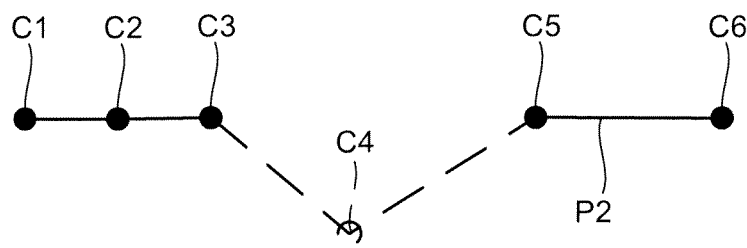
FIG. 6 is an illustration of an alternate path of a computerized mobile device including a plurality of coordinates.

It will be recognized that the coordinates received by the receiver 106 from the system S may be incomplete. That is, coordinate systems (such as GPS) rely on the receiver 106 having a line of sight to the satellites that define the constellation of satellites required by the GPS system, and thus it is possible for the system to momentarily loose that line of sight. As illustrated in FIG. 6, a path P2 is illustrated wherein certain coordinates C1 to C3, C5 and C6 are illustrated in solid line to represent that they have been received and stored by the processor 108. Alternatively, coordinate C4 and the portion of the path P2 extending from C3 to C5 are illustrated in dashed line to represent that C4 has not been received by the receiver 106 because of loss of signal, and thus the motion of the device 100 between C3 and C5 occurred while the device 100 was not in communication with the system S.

Using the path P2, assuming that the direction of the mobile device 100 is determined at point C2 or C3, then using the last two coordinates stored by the processor 108 in the memory 110 (e.g., C1 and C2 for C2, or C2 and C3 for C3) will result in a direction that is representative of the actual direction of motion of the mobile device 100. However, if one were to use the last two coordinates stored by the processor 108 to determine the heading of the mobile device 100 when the device was at either coordinate C4 or C5, the heading calculated using either C2/C3 or C3/C5 would not be representative of the heading of motion of the mobile device. Assuming that the top of the page represents due north, if the processor 108 used the last two coordinates stored by the processor 108 at either C4 or C5, then the processor 108 would determine that the heading of the device is due east, when in fact it is either actually southeast (C4) or northeast (C5).

Consequently, the method 250 may include a block 270 wherein the coordinates to be used in the heading determination at block 272 are first examined to determine if they will provide a reliable heading such as may be displayed to the user at block 274. For example, the coordinates may be selected for heading determination at block 272 according to whether a distance threshold has been exceeded. For example, it may be determined that if the distance between first and second coordinates received successively in time exceeds 100 meters, then the more recent coordinate (i.e., the second coordinate) may be retained, but the older coordinate (i.e., the first coordinate) may be discarded in favor of a coordinate still more recent in time. For example, in the example illustrated in FIG. 6, it may be determined at C5 that the distance between C5 and the preceding coordinate, C3, exceeds the distance threshold. For this reason, the method may delay display of the heading on the display unit 102 until such time as the mobile device reaches coordinate C6, at which time the method 250 may determine that the distance threshold is not exceeded, and the heading determined using the most recent two coordinates, C5 and C6, may be displayed to the user on the display unit 102.

Once at least first and second coordinates have been selected at block 270, the method 250 may continue to the heading determination at block 272. For the heading determination, the processor 108 fits a line (or perhaps more correctly, a vector) to the first and second coordinates, using the first coordinate as the origin or fixed point and the second coordinate to determine the direction. This direction may then be compared against the frame of reference to determine the compass heading corresponding to the direction of the vector so defined. The processor 108 then controls the display unit 102 to display this compass heading at block 274.

In relation to alternative embodiments, the device 100 may also include and the processor may also be coupled to other equipment according to the desired operational functionality of the device 100.

For example, the device 100 illustrated in FIG. 1 may be a configured to be a mobile telephone or smart phone. In such a case, the device 100 may include a radio frequency (RF) transceiver 120 to communicate with a mobile communication system over an RF communication link. The device 100 may also include a speaker 122 and a microphone 124 to facilitate use of the device 100 as a telephone. The device 100 may also include a keypad or keyboard 126 to permit alphanumeric communication, or the display unit 102 may alternatively be configured as a touch screen. All of these additional devices 120, 122, 124, 126 may be coupled to the processor 108.

Alternatively, the device 100 may be configured to be a mobile computing device without telephonic capability. According to such an embodiment, the device 100 may still include an RF transceiver 120, but the transceiver may be configured to facilitate communication with a wireless local area computer network, for example a wireless local area network (WLAN) based on the IEEE 802.11 protocol, sometimes referred to as a Wi-Fi network. The device may also include the speaker 122 as well as the keypad or keyboard 126 to facilitate communication over the wireless computer network. However, in addition to featuring a different transceiver, the device may also lack the microphone 124, and may instead include a camera, for example.

It will be recognized that although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

Further, to the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph. In addition, it should be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims).

What is claimed is:

1. A method for displaying a compass heading, the method implemented by a computerized mobile device and comprising:
   receiving, by one or more processors, a plurality of coordinates from a global positioning system, each coordinate representative of a location of the computerized mobile device;
   selecting, by the one or more processors, at least two coordinates by determining a distance between first and second coordinates received successively in time, and discarding the first coordinate if the distance between the first and second coordinates exceeds a distance threshold;
   storing, by the one or more processors, the at least two coordinates in a memory of the computerized mobile device;
   retrieving, by the one or more processors, the at least two coordinates from the memory;
   determining, by the one or more processors, if the computerized mobile device is traveling above or below a motion threshold using the at least two coordinates;
   retrieving, by the one or more processors, a compass heading from an onboard compass and displaying the compass heading from the onboard compass on a display unit of the computerized mobile device if the computerized mobile device is traveling below a motion threshold; and
   determining, by the one or more processors, a compass heading using the at least two coordinates and displaying the compass heading determined from the at least two coordinates on the display unit of the computerized mobile device if the computerized mobile device is traveling above the motion threshold.

2. The method according to claim 1, wherein the motion threshold is a velocity threshold.

3. The method according to claim 2, further comprising calculating, by the one or more processors, the velocity of the computerized mobile device from a distance traveled by the computerized mobile device over a unit of time.

4. The method according to claim 3, further comprising calculating, by the one or more processors, the distance using the at least two coordinates.

5. A tangible non-transitory computer-readable medium having computer executable instructions stored thereon that, when executed by one or more processors of a computerized mobile device, cause the one or more processors to:
   receive a plurality of coordinates from a global positioning system, each coordinate representative of a location of the computerized mobile device;
   select at least two coordinates from the plurality of coordinates by determining a distance between first and second coordinates received successively in time, and by discarding the first coordinate if the distance between the first and second coordinates exceeds a distance threshold;
   store the at least two coordinates in a memory of the computerized mobile device;
   retrieve the at least two coordinates from the memory;
   determine if the computerized mobile device is traveling above or below a motion threshold using the at least two coordinates;
   retrieve a compass heading from an onboard compass and control a display unit to display the compass heading from the onboard compass if the computerized mobile device is traveling below a motion threshold; and
   determine a compass heading using the at least two coordinates and control the display unit to display the compass heading determined from the at least two coordinates if the computerized mobile device is traveling above the motion threshold.

6. The tangible non-transitory computer-readable medium according to claim 5, wherein the motion threshold is a velocity threshold.

7. The tangible non-transitory computer-readable medium according to claim 6, having computer executable instructions stored thereon that, when executed by one or more processors, cause the one or more processors to calculate the velocity of the computerized mobile device from a distance traveled by the computerized mobile device over a unit of time.

8. The tangible non-transitory computer-readable medium according to claim 7, computer executable instructions stored thereon that, when executed by one or more processors, cause the one or more processors to calculate the distance using the at least two coordinates.

9. A computerized mobile device comprising:
a display unit;
an onboard compass unit;
a global positioning system receiver; and
a processor coupled to the display unit, the onboard compass unit, the global positioning system receiver and a memory, the processor programmed to:
receive a plurality of coordinates via the global positioning system receiver, each coordinate representative of a location of the computerized mobile device;
select at least two coordinates from the plurality of coordinates by determining a distance between first and second coordinates received successively in time, and by discarding the first coordinate if the distance between the first and second coordinates exceeds a distance threshold;
store the at least two coordinates in the memory;
retrieve the at least two coordinates from the memory;
determine if the computerized mobile device is traveling above or below a motion threshold using the at least two coordinates;
retrieve a compass heading from the onboard compass and control the display unit to display the compass heading from the onboard compass if the computerized mobile device is traveling below a motion threshold; and
determine a compass heading using the at least two coordinates and control the display unit to display the compass heading determined from the at least two coordinates if the computerized mobile device is traveling above the motion threshold.

10. The device according to claim 9, wherein the motion threshold is a velocity threshold.

11. The device according to claim 10, wherein the processor is programmed to calculate the velocity of the computerized mobile device using a distance traveled by the computerized mobile device over a unit of time.

12. The device according to claim 11, wherein the processor is programmed to calculate the distance traveled by the computerized device using the at least two coordinates for the computerized mobile device.

* * * * *